Feb. 26, 1957 B. ROBERTS 2,783,048

MAGNETIC RECORDING SYSTEM

Original Filed April 10, 1947

INVENTOR
Bruce Roberts

BY
ATTORNEYS

United States Patent Office 2,783,048

Patented Feb. 26, 1957

2,783,048

MAGNETIC RECORDING SYSTEM

Bruce Roberts, Philadelphia, Pa., assignor to The International Electronics Company, Philadelphia, Pa., a corporation of Pennsylvania

Original application April 10, 1947, Serial No. 740,653, now Patent No. 2,653,819, dated September 29, 1953. Divided and this application January 23, 1952, Serial No. 271,124

3 Claims. (Cl. 274—4)

This invention relates to a system of recording and reproducing intelligence which employs as a recording medium a normally flat rectangular record which is adapted to be flexed to cylindrical form during recording and reproduction.

The present application is a division of my copending application Serial No. 740,653, filed April 10, 1947, now Patent No. 2,653,819, issued September 29, 1953.

The invention is particularly adapted for use with record sheets whose resilience may vary from the limpness of tissue paper to the relative stiffness of a resin or composition sheet, for example, that of photographic film.

Broadly speaking, the object of the invention is to record intelligence magnetically in a continuous track on a flat rectangular record sheet which has been temporarily flexed to cylindrical form, and subsequently to reproduce the intelligence so recorded, notwithstanding the fact that the record sheet may, in the interim, have been restored to flat form, folded or creased.

A further object of the invention is to scan a helical track intersecting an edge of a record sheet which has been flexed to cylindrical form and to index the sheet on the form in order to provide for reregistration of the sheet on reinsertion in the same or a similar apparatus.

The invention also contemplates mounting a record on the record support in a manner to establish a driving connection between the support and the record sheet; to provide for reestablishing, upon reinsertion of a sheet in the machine, the alignment between the overlapped edges of the sheet which existed at the time of the recording; and to provide for reestablishment of the original relationship between a recorded track on the sheet and the reproducing head.

The invention, while adapted to the recording of intelligence of widely different forms, is especially adapted for use in recording and reproducing office dictation, in that it provides for very simple loading and unloading of record sheets, while preserving accuracy of alignment even with the limpest record sheets contemplated for use with the invention.

How these objects and others which will appear are attained may be more clearly understood upon reference to the three forms of apparatus described below and disclosed in the drawing, in which.

Figures 1, 2, 3:
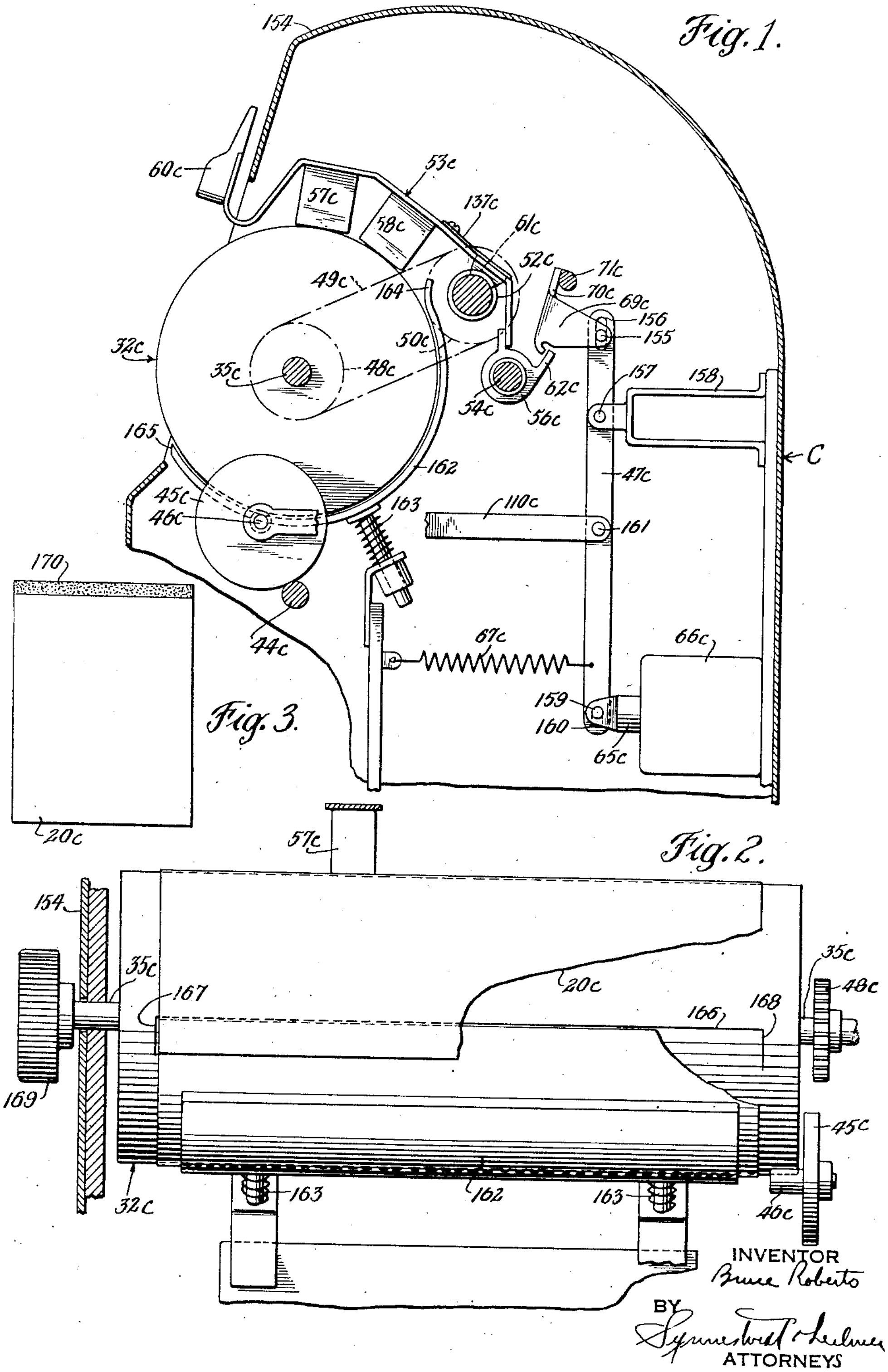
Figure 1 is a vertical sectional view of a machine constructed according to the invention.
Figure 2 is an elevation of portions of the machine of Figure 1.
Figure 3 is a plan view on a reduced scale of a record sheet particularly adapted for use with the machine shown in Figures 1 and 2.

The apparatus which is about to be described is adapted for use in recording and reproducing intelligence on flexible, rectangular record sheets carrying magnetizable material.

Such sheets comprise finely divided particles of magnetic material having high magnetic retentivity and high coercive force, dispersed in a non-magnetic binder, and preferably supported by a non-magnetic backing member.

While it is possible to record intelligence magnetically on a record medium comprising a homogeneous mass of magnetic material, it has been found that the desirable magnetic properties above enumerated are invariably accompanied in homogeneous sheets by undesirable physical properties. Magnetic materials having the requisite coercive force and retentivity tend to be so brittle and hard that it is difficult to work them by rolling or drawing, and, on the other hand, materials which are susceptible to fabrication tend to have inadequate retentivity and coercive force. Furthermore, even if record media are fabricated of materials having suitable magnetic characteristics, the physical properties of records so made are undesirable for the purposes contemplated herein. For example, a record sheet of carbon steel having only moderate retentivity and coercive force is still so brittle that attempts to fold it inevitably result in breaking the record.

Practical considerations of reasonable duration of a record within a limited physical size require that the sheet be scanned at a relatively low translational speed. As the scanning speed decreases, the output voltage of the reproducing head also decreases, since the voltage is proportional to the rate of change of the magnetic field. As a result, lower scanning speeds require more amplification and hence render the equipment more sensitive to extraneous noise. Indeed, attempts to employ a homogeneous sheet flexed to cylindrical form with opposite edges overlapped result in a particularly objectionable disturbance, in the nature of a click or plop, every time the overlapped edges pass the reproducing head. This phenomenon is apparently due to the concentration of the magnetic lines of force along the edge of the homogeneous metal sheet.

In contrast, records of the type shown in section in Figure 3, comprises finely divided particles of magnetic material dispersed in a flexible, non-magnetic binder, may be produced economically, and are resistant to a remarkable degree to the most severe treatment. Sheets of this character may be folded, creased, wrinkled, and otherwise distorted without interfering with their magnetic properties and without destroying or appreciably affecting in any way the quality of reproduction of a recording thereon.

Since the magnetic particles in sheets of the type described are effectively isolated, no concentration of the lines of force occurs at the edge of the sheet, with the result that the plop or click which is characteristic of a homogeneous sheet is completely obviated, despite the low speed and consequent high amplification employed in the practice of the invention.

However, it should be pointed out that sheets having dispersed magnetizable particles present certain problems which must be overcome if they are to be used as recording media. Primarily, the same flexibility and immunity to ill effects from distortion reqire novel handling techniques to reestablish the relative alignment of the portions of a record recorded on a sheet. Principal among these characteristics is the "limpness" of record sheets of the type under discussion. When it is realized that the sheets have a thickness of from 1 to 5 thousandths of an inch and an appearance and "feel" approximately equal to that of ordinary carbon paper, some appreciation of the problems involved will be realized.

The record sheet may be of any convenient size, depending on the nature and type of intelligence to be recorded, but preferably, for office dictation work, as illustrated in Figure 3, the sheet should be of standard letter size, for example, 8½″ by 11″. By standardizing on this size and shape of record sheet, all the auxiliary equipment of letter communication becomes available. For example, folded and creased sheets may be mailed in standard envelopes, and may be filed in either flat or folded form in standard file folders, standard file cabinets, and the like.

The record sheet comprises a flexible layer, comprising magnetizable particles, preferably supported by a flexible backing. The magnetizable material is preferably a material having a high magnetic retentivity and high coercive force, for example, Alnico-5, dispersed in a flexible non-magnetic binder, for example, a resin such as "Vinylite," a sheet of which is capable of being employed in the apparatus of the invention even without a backing member. The backing member, if one is employed, may advantageously be paper or some other material having the characteristics of great resistance to cracking upon folding and creasing and the ability to assume a substantially flat form after flexure to a closed loop, or after creasing. The binder for the magnetizable particles has similar properties, and therefore a record medium made in accordance with the invention is capable of repeated flexing to cylindrical form and of repeated creasing and uncreasing without disturbance of the bond between the magnetizable material and the backing member and without interference with the orientation of the individual magnetizable particles in relation to each other. The resilience of the material operates to restore it to flat form as it is released from the cylinder, which is not only advantageous for purposes of ultimate disposition, but also aids in removing the sheet from the machine, as will appear.

I have found that the best combination of the properties above discussed is obtained with a sheet of from about 1 to about 5 thousandths of an inch in thickness, and most desirably, with sheets from 2 to 3 thousandths of an inch thick.

During recording and reproduction, a sheet **20*c* is supported upon a cylindrical form or barrel generally indicated at 32*c*** in Figures 1 and 2.

The circumference of the barrel should be no greater than the length of sheet **20*c*** and preferably the circumference should be somewhat less than the length of the sheet in order to provide for a slight overlap when the sheet is wrapped around the barrel, as shown in Figure 2. In dictation machines which are standardized on the basis of 8½" by 11" paper, the circumference of the cylinder is approximately 10½".

It will be seen that the machine is housed in a cabinet 154 in a manner to partially expose drum **32*c*. Drum 32*c* is mounted for rotation on a shaft 35*c*, which shaft is journalled in the side panels of cabinet 154. Shaft 35*c* carries at its right hand end for rotation therewith a drive sprocket 48*c* having a chain 49*c* in engagement therewith, which chain also engages a driven sprocket 50*c*, driveably associated with a lead screw 52*c***.

An axial way **54*c* extends parallel to the axis of cylindrical form 32*c* and carries thereon a carriage 53*c*. Mounted on carriage 53*c* are erase head 57*c*, record-reproduce head 58*c*, a half nut 61*c*, yieldingly held against lead screw 52*c* by a spring 137*c*, and a pointer 60*c* adapted to traverse a scale on the outside of cabinet 154. Pointer 60*c* also provides means for manually adjusting the position of carriage 53*c* axially of form 32*c***.

Carriage **53*c* also comprises a sleeve 56*c* having a tab 62*c* adapted to be engaged by shift bar 70*c*, which bar is mounted for oscillation with shaft 71*c*. Shift bar 70*c* is provided with a crank 69*c* which is connected to the upper end of shift arm 47*c* by a pin 155, which engages a slot 156 in arm 47*c*. Arm 47*c* is mounted for oscillation on a pin 157 supported by a standard 158 and is connected at its lower extremity to armature 65*c* of solenoid 66*c* by a pin 159, penetrating a slot 160 in arm 47*c*. Intermediate pins 157 and 159, shift arm 47*c* is pivotally connected to a cross arm 110*c* by a pin 161. Journalled in the opposite end of cross arm 110*c* is a shaft 46*c*, carrying drive puck 45*c*, which is in constant peripheral engagement with shaft 44*c* of a driving motor, not shown. Shift arm 47*c* is biased by a spring 67*c*, anchored to a fixed bracket, which spring normally tends to hold shaft 46*c* of driving puck 45*c* out of engagement with drum 32*c* and also imposes a torque moment on tab 62*c* of carriage 53*c* in a sense to disengage heads 57*c* and 58*c* from drum 32*c* and a half nut 61*c* from lead screw 52*c*. Energization of solenoid 66*c*, however, shifts arm 47*c* in a sense to driveably engage shaft 46*c* of puck 45*c* with drum 32*c*, and throws shift bar 70*c* out of engagement with tab 62*c*, permitting heads 57*c* and 58*c* to engage drum 32*c* and half nut 61*c* to engage lead screw 52*c***, all by gravity.

The machine is provided with a guide 162, which is yieldingly pressed against drum **32*c* by springs 163. Guide 162 extends axially of drum 32*c* and is provided at one edge with a lip 164 to adapt it to receive the leading edge of a record sheet supported on drum 32*c* and at the opposite edge with a stripper blade 165** adapted to assist in removing a sheet from the drum on reverse rotation thereof, as will appear.

In Figure 2, it will be seen that drum **32*c* is provided with an index line 166, extending axially of the drum to provide for peripheral registration of the leading edge of a record sheet 20*c* and also with a pair of index lines 167 and 168, extending circumferentially of drum 32*c* to provide for axial registration. A knob 169, keyed to shaft 35*c*, provides for manual rotation thereof and hence of drum 32*c***.

The machine is adapted for use with record sheets of the type disclosed at **20*c* in Figure 3. This sheet is characterized by the magnetizable coating discussed above, and also, on the reverse side, by a strip of pressure-sensitive adhesive material 170, which is adapted to removably secure a sheet 20*c* to drum 32*c*. The presence of the adhesive also serves to identify the top of the sheet. In operation, the drum 32*c* is manually rotated to a position in which index lines 166, 167 and 168 are exposed, whereupon a sheet 20*c* is placed in contact with the drum with its leading edge in alignment with index line 166 and the adjoining edges in alignment with index lines 167 and 168. Pressure is then applied with the finger to secure the leading edge of the sheet to the drum in that position, whereupon rotation of the drum is effected by means of knob 169 until sheet 20*c* is wrapped around drum 32*c* with its trailing edge lapped over the leading edge, after which scanning is commenced by energizing solenoid 66*c*, which, as described above, initiates rotation of drum 32*c* and translational movement of carriage 53*c***.

Back spacing of carriage **53*c* is effected by grasping pointer 60*c* with the fingers and moving carriage 53*c* on axial way 54*c*. To remove the sheet, drum 32*c* is rotated in a forward direction until the trailing edge of the sheet is in an exposed position, whereupon the drum is rotated in a reverse direction by means of knob 169. The trailing edge of the sheet, since it has a natural tendency to straighten out, separates somewhat from drum 32*c* and is engaged by stripper edge 165 of guide 162. The trailing edge of the sheet may then be seized with the fingers, and by concurrent tension on the sheet and rotation of drum 32*c*, the adhesive joint between the sheet and the drum will be brought into contact with edge 165, which will effect separation of the sheet and drum, thus freeing the sheet. When it is desired to reproduce a record made in accordance with the above procedure, the sheet is again carefully registered relative to lines 166, 167 and 168**, and the loading procedure repeated, upon which the sheet will be restored to the position it occupied during recording.

The arrangement provides means for positioning a previously recorded sheet in the apparatus in a manner to permit reproduction of the intelligence recorded thereon without regard to the intervening history of the sheet.

Such positioning involves first, establishing a driving connection between the record support and the record sheet; second, reestablishing the alignment between the overlapped edges of the sheet which existed at the time of recording; and third, providing for reestablishment of the original relationship between a recorded track on the sheet and the reproducing head.

The connection between the record support and the record sheet is achieved through the use of an adhesive deposited on the reverse side of the leading portion of the record sheet. The axial and peripheral position of the sheet is determined by indexing the sheet relative to index lines formed on the drum.

When a helical track is recorded on a sheet mounted on the support in the manner described, each turn of the helix is intersected by the line of overlapping. Upon reinsertion of a sheet in the machine after removal, the trailing portion of each turn must be accurately aligned with its corresponding leading portion. According to the invention, this is accomplished primarily by registering the sheet on the drum with one axis (that is, with the leading edge) parallel to the axis of the support. Since the trailing edge is parallel to the leading edge, when the sheet is wrapped upon the support and assumes the form of a cylinder of uniform length (determined by the width of the sheet) the trailing edge falls into a position of alignment with the leading edge. This result is enhanced by the action of the head and guide elements which "wipe" the trailing edge into its position relative to the leading edge even after creasing of a sheet.

It should be noted at this time that the machine is arranged to provide for scanning of a record track across the line of overlapping in a direction from the upper layer to the lower layer. Since the upper layer is therefore under tension, there is no possibility of entanglement of an edge with the heads as would be the case were rotation effected in the opposite direction, that is, with the upper layer the leading edge. As a consequence of scanning the sheet in this direction, it is possible to bias the heads against the record with sufficient pressure to maintain an intimacy of contact adequate for faithful reproduction. The heads are maintained against the record surface by gravity. The cushion illustrated in the B form of the invention aids in preserving this intimacy of contact by permitting a slight distortion of the record surface in the immediate vicinity of the pole pieces, thus permitting contact throughout an area rather than in a single point or line as would be the case if the recording surface is absolutely unyielding. Of course, the record sheets themselves, thin as they are, afford some cushioning effect.

It will also be noted that I have disclosed non-rotating guide elements for maintaining the record sheet in substantial contact with the record support, at least throughout a portion of the circumference of the support. These guides, which may be spring-held against the support, not only serve to prevent the trailing edge of the sheet from becoming entangled with other parts of the apparatus, but also assist in "ironing out" wrinkles and creases in the sheet which, in turn, insures accurate peripheral alignment of the overlapping portions of the sheet. They also assist in reestablishing axial alignment of the overlapping portions of the sheet by forcing the sheet to conform to the cylindrical surface of the support and thus to assume a shape congruent to the support and, therefore, to assume the same position whenever again reintroduced into the machine.

I have illustrated a mechanism in which the feeding of a record to the support is effected manually, the registration being accomplished by visual means, as described above. However, the machine includes means for engaging the trailing edge of the record sheet upon reverse rotation of the record support. This is especially desirable when employing sheets which are adhesively secured to the record support, since the stripper assists in disengaging and separating the adhering portions of the record sheet and support.

The operating potentialities of the invention may best be appreciated upon consideration of a brief description of certain aspects of operation. Upon closing of the drive-energizing switch, the drum begins to rotate and the carriage to be translated relative to the drum at a speed determined by the operating speed of the motor and the design of the drive train. With 8½" by 11" sheets, I have found that from 10 to 30 lines per inch and a linear scanning speed of from 4 to 10 inches per second give an appropriate range of operating conditions. Scanning 20 lines per inch at about 5½" per second on an 8½" by 11" sheet gives about 5 minutes of recording time.

One example of the flexibility and adaptability of the apparatus to office dictation work is to be found in the ease with which portions of a previously recorded message may be deleted and simultaneously replaced with new material. If a mistake has been made in dictation, the carriage is back spaced to a point somewhat in advance of the portion of the record bearing the material to be erased. The equipment is then adjusted for reproduction and the energizing switch closed until the last of the material which is to be retained is heard. At this point, the energizing switch is opened, the equipment readjusted for recording, the energizing switch is closed, and the correct material is recorded. Since the erase head sweeps the track just in advance of the recording head, the previously recorded material is obliterated and the erased track is immediately rerecorded with the new material. When, as is contemplated by the invention, the energizing switch takes the form of a foot switch, this cycle of erasing and redictating can be accomplished with great accuracy. For example, it is possible to remove as little as a single word and replace it with another word, and thereby produce a record which, upon reproduction, gives no evidence that it was not recorded consecutively. A further demonstration of the accuracy of alignment which is accomplished by the invention is the fact that even a record which has been removed from the machine may be reinserted for erasure and redictation in the manner above described.

From the foregoing it will be seen that according to the invention magnetic recordings are made in the form of what is effectively a single helical track upon foldable, creasible, rectangular sheets which have been flexed to cylindrical form. Upon removal and unflexing of the sheets, the single track is separated into fragments which may later be reassembled for continuous reproduction.

I claim:

1. In a telegraphone, mechanism for scanning flexible, rectangular record sheets carrying dispersed magnetizable particles, comprising a support member, a scanning head supported thereon, a form, a record sheet wrapped thereon with one edge secured to the form and the opposite edge free, means for effecting motion, in the direction of wrapping, of said form relative to the support means and said head in a scanning path repeatedly crossing said opposite edge of the sheet, guide means supported by said member independently of said head, for maintaining the sheet adjacent the surface of the form throughout at least a portion of the circumference thereof, and resilient means for maintaining said guide means in intimate sliding contact with the sheet on the form.

2. A dictation machine comprising a support, a mandrel rotatably mounted thereon, a creasible, flexible, and limp rectangular non-magnetic record sheet carrying dispersed magnetizable particles, means securing the leading edge of the sheet to the mandrel, the sheet being externally wrapped on the mandrel with the trailing edge overlapping the leading edge with freedom for movement circumferentially of the mandrel, a magnetic scanning device mounted on the support, means for rotating the mandrel relative to said device, and means independently mounted on the support and yieldingly urged against the sheet on the mandrel to iron out any crease present in the record sheet intermediate the leading and trailing edges by movement of the trailing edge of the sheet circumferentially of the mandrel.

3. A machine in accordance with claim 2, and further including index means on the mandrel for determining the circumferential position of the sheet on the mandrel, in which apparatus the scanning device yieldingly engages the sheet in a scanning path overlying said index means.

References Cited in the file of this patent

UNITED STATES PATENTS

| | | |
|---|---|---|
| 1,225,988 | Meyering | May 15, 1917 |
| 1,327,075 | Zaiss | Jan. 6, 1920 |
| 2,043,884 | Crudo | June 9, 1936 |

| | | |
|---|---|---|
| 2,216,608 | Anderson | Oct. 1, 1940 |
| 2,259,715 | Woolf | Oct. 21, 1941 |
| 2,375,603 | Willard | May 8, 1945 |
| 2,431,360 | Philpott | Nov. 25, 1947 |
| 2,478,539 | Leitner | Aug. 9, 1949 |
| 2,535,480 | Begun | Dec. 26, 1950 |
| 2,653,819 | Roberts | Sept. 29, 1953 |

FOREIGN PATENTS

| | | |
|---|---|---|
| 386,842 | Great Britain | Jan. 26, 1933 |

OTHER REFERENCES

Serial No. 268,418, Konig et al. (A. P. C.), published May 4, 1943.